US012589489B2

(12) United States Patent
Scaglione et al.

(10) Patent No.: US 12,589,489 B2
(45) Date of Patent: Mar. 31, 2026

(54) PRESSURIZED SLEEVE FOR ROUTING OF LINEAR COMPONENTS

(71) Applicant: International Business Machines Corporation, Armonk, NY (US)

(72) Inventors: Joseph Scaglione, Poughkeepsie, NY (US); Ryan Elsasser, Salt Point, NY (US); Daniel Ruiz, Cold Spring, NY (US); Schuyler Mann, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/589,826

(22) Filed: Feb. 28, 2024

(65) Prior Publication Data

US 2025/0271005 A1 Aug. 28, 2025

(51) Int. Cl.
 B25J 9/06 (2006.01)
 B25J 9/14 (2006.01)
 B25J 18/06 (2006.01)
 F15B 15/10 (2006.01)

(52) U.S. Cl.
 CPC ............... B25J 9/142 (2013.01); B25J 9/065 (2013.01); B25J 18/06 (2013.01); F15B 15/10 (2013.01)

(58) Field of Classification Search
 CPC . F15B 15/10; F16L 55/38; F16L 55/44; B25J 9/142; B25J 9/065; B25J 18/06
 See application file for complete search history.

(56) References Cited

U.S. PATENT DOCUMENTS

| | | | | |
|---|---|---|---|---|
| 4,372,161 | A | * | 2/1983 | de Buda ................. F16L 55/44 254/134.6 |
| 4,715,100 | A | | 12/1987 | Cross |
| 5,758,731 | A | * | 6/1998 | Zollinger ................ E21B 23/04 175/51 |
| 5,944,663 | A | * | 8/1999 | Kuth ................... A61B 17/2255 601/3 |
| 6,162,171 | A | * | 12/2000 | Ng ........................ A61B 1/0055 600/101 |

(Continued)

FOREIGN PATENT DOCUMENTS

| | | |
|---|---|---|
| CN | 1671339 A | 9/2005 |
| CN | 1960603 A | 5/2007 |

(Continued)

OTHER PUBLICATIONS

Scaglione et al., "Linear Component Installation/Uninstallation Using Pressurized Sleeve", U.S. Appl. No. 18/589,871, filed Feb. 28, 2024.

(Continued)

*Primary Examiner* — Dustin T Nguyen
(74) *Attorney, Agent, or Firm* — Michael O'Keefe

(57) ABSTRACT

According to an embodiment of the present invention, a pressurized sleeve for routing of linear components is provided. The pressurized sleeve is disposed to at least partially surround a flexible line object. A plurality of pouches is disposed in the robotic cable sleeve. At least two pouches of the plurality of pouches have different predetermined hydrostatic pressures from one another which induce axial movement of at least a portion of the robotic cable sleeve and a corresponding portion of the at least partially surrounded linear component.

17 Claims, 9 Drawing Sheets

(56) References Cited

U.S. PATENT DOCUMENTS

| | | | |
|---|---|---|---|
| 6,435,354 | B1 | 8/2002 | Gray |
| 6,875,170 | B2 * | 4/2005 | Francois ............... F15B 15/103 |
| | | | 600/152 |
| 6,972,949 | B1 | 12/2005 | Helgenberg |
| 7,584,597 | B2 | 9/2009 | Blase |
| 7,650,743 | B2 | 1/2010 | Wehler |
| 9,198,563 | B2 * | 12/2015 | Ferren .................... A61B 1/041 |
| 10,179,410 | B2 | 1/2019 | Lessing |
| 10,257,599 | B2 | 4/2019 | Becker |
| 10,965,083 | B2 | 3/2021 | Pechter |
| 11,040,457 | B2 | 6/2021 | Carruthers |
| 11,165,662 | B2 | 11/2021 | Childers |
| 11,404,183 | B2 | 8/2022 | Mitchell |
| 11,610,702 | B2 | 3/2023 | Mitchell |
| 11,950,763 | B2 * | 4/2024 | Liao ......................... B25J 9/065 |
| 2002/0107478 | A1 * | 8/2002 | Wendlandt ........... A61B 1/0052 |
| | | | 604/95.01 |
| 2008/0275299 | A1 | 11/2008 | Park |
| 2019/0167369 | A1 | 6/2019 | Devengenzo |
| 2019/0367334 | A1 | 12/2019 | Maier |
| 2020/0221938 | A1 * | 7/2020 | Liao ................... A61B 1/00119 |
| 2022/0223270 | A1 * | 7/2022 | Masson ................. G16H 40/20 |
| 2025/0273935 | A1 | 8/2025 | Scaglione et al. |

FOREIGN PATENT DOCUMENTS

| | | | |
|---|---|---|---|
| CN | 103280722 | A | 9/2013 |
| CN | 112032464 | A | 12/2020 |
| CN | 212276847 | U | 1/2021 |
| CN | 113286542 | A | 8/2021 |
| CN | 116018105 | A | 4/2023 |
| CN | 116664765 | A | 8/2023 |
| CN | 117083030 | A | 11/2023 |
| DE | 102022115259 | B3 | 11/2023 |
| WO | 2020177965 | A1 | 9/2020 |
| WO | 2025/181558 | A1 | 9/2025 |
| WO | 2025/181568 | A1 | 9/2025 |

OTHER PUBLICATIONS

List of IBM Patents or Patent Applications Treated as Related, Filed Feb. 28, 2024, 2 pages.

Buzzato et al., "On Robotic Manipulation of Flexible Flat Cables: Employing a Multi-Modal Gripper with Dexterous Tips, Active Nails, and a Reconfigurable Suction Cup Module", Conference: IEEE/RSJ International Conference on Intelligent Robots and Systems At: Kyoto, Japan, Oct. 2022, DOI:10.1109/IROS47612.2022. 9981313, 7 pages.

Ohta et al., "Design of a Lightweight Soft Robotic Arm Using Pneumatic Artificial Muscles and Inflatable Sleeves", Soft Robotics, vol. 5, No. 2, 2018, DOI: 10.1089/soro.2017.0044, 12 pages.

International Searching Authority, "Notification of Transmittal of the International Search Report and the Written Opinion of the International Searching Authority, or Declaration," Patent Cooperation Treaty Jun. 4, 2025, 06 pages, International Application No. PCT/ IB2025/050121.

International Searching Authority, "Notification of Transmittal of the International Search Report and the Written Opinion of the International Searching Authority, or Declaration," Patent Cooperation Treaty Jun. 5, 2025, 06 pages, International Application No. PCT/ IB2025/050352.

* cited by examiner

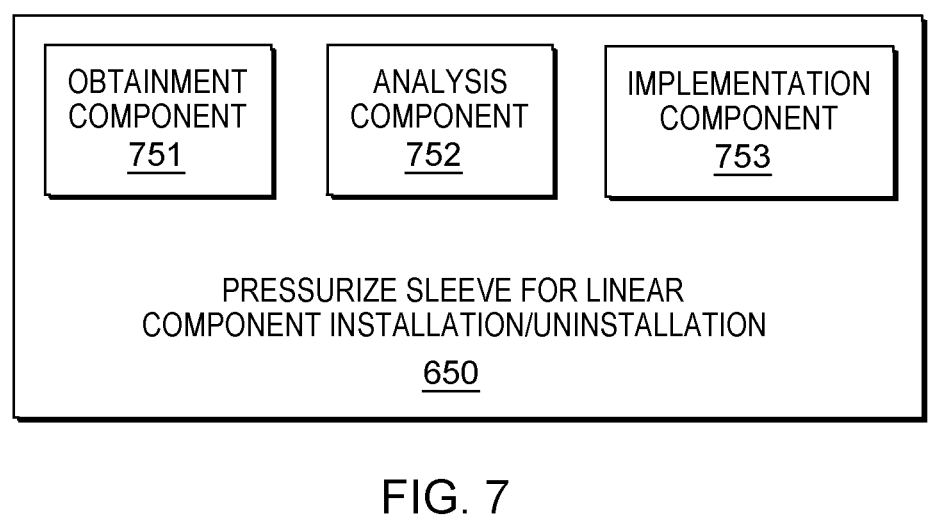

OBTAINMENT COMPONENT 751

ANALYSIS COMPONENT 752

IMPLEMENTATION COMPONENT 753

PRESSURIZE SLEEVE FOR LINEAR COMPONENT INSTALLATION/UNINSTALLATION 650

FIG. 7

PRESSURIZED SLEEVE FOR ROUTING OF LINEAR COMPONENTS

BACKGROUND

Exemplary embodiments of the present invention relate to routing of linear components, and more particularly, to a pressurized sleeve for routing of linear components.

A project including installation and/or uninstallation (installation/uninstallation) of linear components (e.g., wires, cables, ropes, etc.) in relation to an overall apparatus can be a complex and tedious process involving a multitude of factors (e.g., project element characteristics/project environment characteristics/risks, etc.). The multitude of factors require precise analysis and modifications at various stages for success (e.g., before/during/after implementation). Failure to precisely anticipate/recognize/mitigate factors, such as excessive physical manipulation of the linear components, spatial conflicts between project elements, and/or inevitable deviations in project design frequently undermine project success and/or efficiency (e.g., installation/uninstallation of the linear components and/or other project elements).

For example, cabling is the most time-consuming and error-prone process in assembling a mainframe. Cabling is primarily performed by a human operator. Installation/uninstallation of cables to a mainframe without introducing mutual interference and/or damage proves to be a persistent difficulty for human operators alone. Even with proper instructions and training, cabling performed by human operators remains significantly flawed. Human operators are incapable of comprehensively negotiating the complex interplay of the multitude of factors, avoiding human error, recognizing imperceivable risks, performing ad hoc improvisations, avoiding damage to the cables/other project elements from excessive bending, and/or avoiding spatial conflicts due to selected arrangement and inevitable deviations therefrom.

Although apparatuses exist for installing certain project components (e.g., for routing individual wires in a substantially linear, single plane on a circuit board), these apparatuses can involve significant human input, elaborate mechanical machinery (which are prone to damage and/or are not feasible for a multitude of larger scale installations such as cabling), and neglect a precise analysis/implementation based on the complex interplay of the multitude of factors. Existing apparatuses attempt to address aspects of the stated problem but fail to facilitate completely autonomous installations/uninstallations for a variety of linear components, particularly based on a precise analysis of the multitude of installation/uninstallation factors and risks.

As a result, human operators and/or pre-existing apparatuses persist to perform installation/uninstallation of linear components with improper techniques, project designs, and/or applied forces, resulting in spatial conflicts, and/or actual/latent damage to project elements (e.g., the linear component, other project elements (e.g., component ports, cable connectors, other linear components, etc.), the apparatus for installation/uninstallation, etc.), and/or loss of overall system efficiency/functionality/lifespan.

SUMMARY

According to an embodiment of the present invention, a pressurized sleeve for routing of linear components is provided. A linear component is disposed at least partially surrounded by the pressurized sleeve. A plurality of pouches are disposed in the pressurized sleeve. At least two pouches of the plurality of pouches have different predetermined hydrostatic pressures from one another which induce movement in at least one dimension of at least a portion of the pressurized sleeve and a corresponding portion of the at least partially surrounded linear component.

According to an exemplary embodiment of the present invention, a pressurized sleeve for routing linear components is provided. A robotic cable sleeve is disposed at least partially surrounding a flexible linear component. A plurality of pouches and a plurality of sensors are disposed in the robotic cable sleeve, wherein at least two of the plurality of pouches have different predetermined hydrostatic pressures from one another that induce or preserve a predetermined shape of at least a portion of the robotic cable sleeve and a corresponding portion of the at least partially surrounded flexible linear component.

According to an exemplary embodiment of the present invention, a pressurized sleeve for routing linear components is provided. A robotic cable sleeve is disposed at least partially surrounding an at least partially flexible linear component. The at least partially flexible linear component is a wire or a cable, and the robotic cable sleeve includes a plurality of sensors and a plurality of pouches with adjustable hydrostatic pressures. A robotic stand is connected to the robotic cable sleeve. A controller is connected to the robotic cable sleeve and the robotic stand for implementing a predetermined project design. The implementing of the project design includes adjusting hydrostatic pressures of at least some of the pouches with adjustable hydrostatic pressures of the plurality of pouches with adjustable hydrostatic pressures. The implementing of the predetermined project design includes installation or uninstallation of the at least partially flexible linear component in relation to an apparatus by inducing predetermined movements, shapes, and positions of the robotic cable sleeve and a corresponding portion of the at least partially flexible linear component. At least one a 3D depth camera and an IoT feed is connected to the controller for obtaining real-time project design characteristics that include the implementation of the predetermined project design. The controller modifies the predetermined project design based on an analysis of the obtained real-time project design characteristics that include the implementation of the predetermined project design.

BRIEF DESCRIPTION OF THE DRAWINGS

The following detailed description, given by way of example and not intended to limit the exemplary embodiments solely thereto, will best be appreciated in conjunction with the accompanying drawings, in which:

FIG. 7 illustrates a block diagram of components 751-753 included in the pressurized sleeve for linear component installation/uninstallation program 650, in accordance with an exemplary embodiment of the present inventive concept.

Figure 1A:
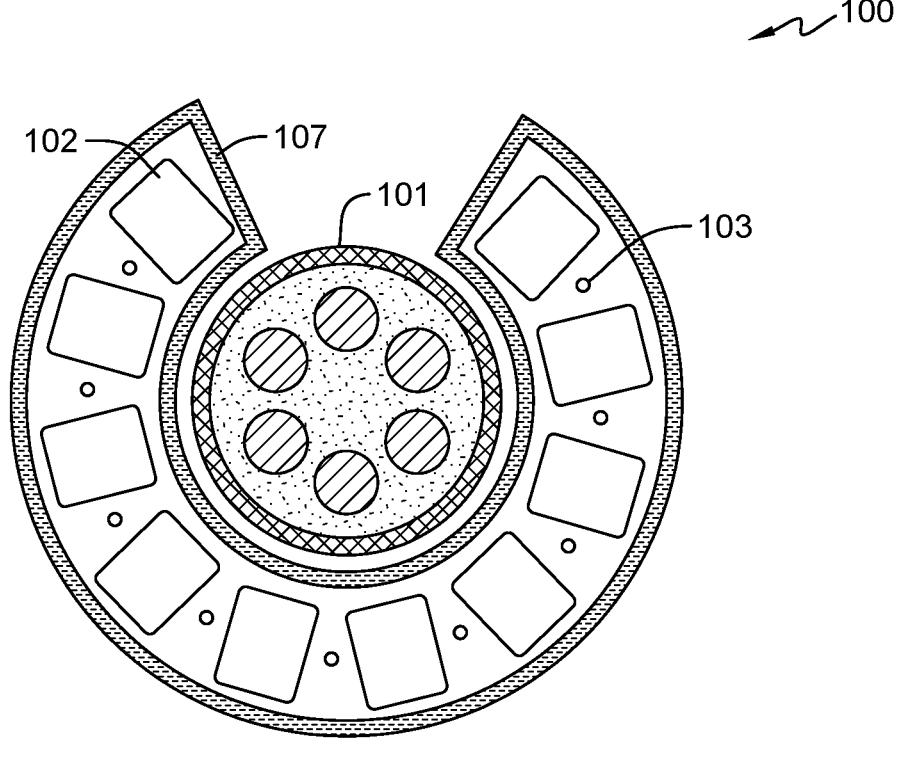
FIG. 1A and FIG. 1B illustrate a side cross-sectional view and a top cross-sectional view of a pressurized sleeve 100 for linear component 101 installation/uninstallation, respectively, in accordance with exemplary embodiments of the present inventive concept.

It is to be understood that the included drawings are not necessarily drawn to scale/proportion. The included drawings are merely schematic examples to assist in understanding of the present invention and are not intended to portray fixed parameters. In the drawings, like numbering may represent like elements.

DETAILED DESCRIPTION

Exemplary embodiments of the present invention are disclosed hereafter. However, it shall be understood that the scope of the present invention is dictated by the claims. The disclosed exemplary embodiments are merely illustrative of the claimed invention. The present invention may be embodied in many different forms and should not be construed as limited to only the exemplary embodiments set forth herein. Rather, these included exemplary embodiments are provided for completeness of disclosure and to facilitate an understanding to those skilled in the art. In the detailed description, discussion of well-known features and techniques may be omitted to avoid unnecessarily obscuring the presented exemplary embodiments.

References in the specification to "one embodiment," "an embodiment," "an exemplary embodiment," etc., indicate that the embodiment described may include a particular feature, structure, or characteristic, but not every embodiment may necessarily include that feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether explicitly described.

In the interest of not obscuring the presentation of the exemplary embodiments of the present invention, in the following detailed description, some processing steps or operations that are known in the art may have been combined for presentation and for illustration purposes, and in some instances, may have not been described in detail. Additionally, some processing steps or operations that are known in the art may not be described at all. The following detailed description is focused on the distinctive features or elements of the present invention according to various exemplary embodiments.

As aforementioned, a project including installation/uninstallation of linear components (e.g., wires, cables, ropes, etc.) in an overall apparatus is presently a complex, tedious, inefficient, and error prone process which is primarily performed by human operators. Apparatus based solutions directed to at least partial automation of linear component installation involve substantially linear planes of movement, require significant degrees of human input, elaborate mechanical devices (which are not feasible for a multitude of larger scale installations (e.g., cabling), and neglect analysis of the complex interplay of the multitude of installation factors. Human operators and/or preexisting apparatuses thus fail to effectively and consistently negotiate the multitude of factors, such as: connector styles, connection forces (e.g., plug forces), thresholds of predetermined use, project element characteristics (e.g., dimensions, materials, minimum/maximum bend radii, etc.); project environment characteristics (e.g., project designs, faithfulness, project workspaces, and inevitable deviations/improvisations, space limitations, destination points, etc.); risks (e.g., deviations in predetermined use thresholds, actual/latent project element damage, spatial conflicts between project elements, efficiency/functionality/lifespan of project elements/overall system, resource sufficiency, interference between installation/uninstallation devices and/or human operators, etc.), etc.

Embodiments of the present invention address these shortcomings and more with a pressurized sleeve for routing of linear components that includes pouches with adjustable hydrostatic pressures, which can be coupled with system implementations (e.g., controllers, 3D depth cameras, IoT feed, external computing devices, etc.) and methods therefor. Thus, the pressurized sleeve, system implementations, and methods therewith enable at least substantially autonomous linear component installation/uninstallation that avoids the identified shortcomings, at least.

Figure 1B:
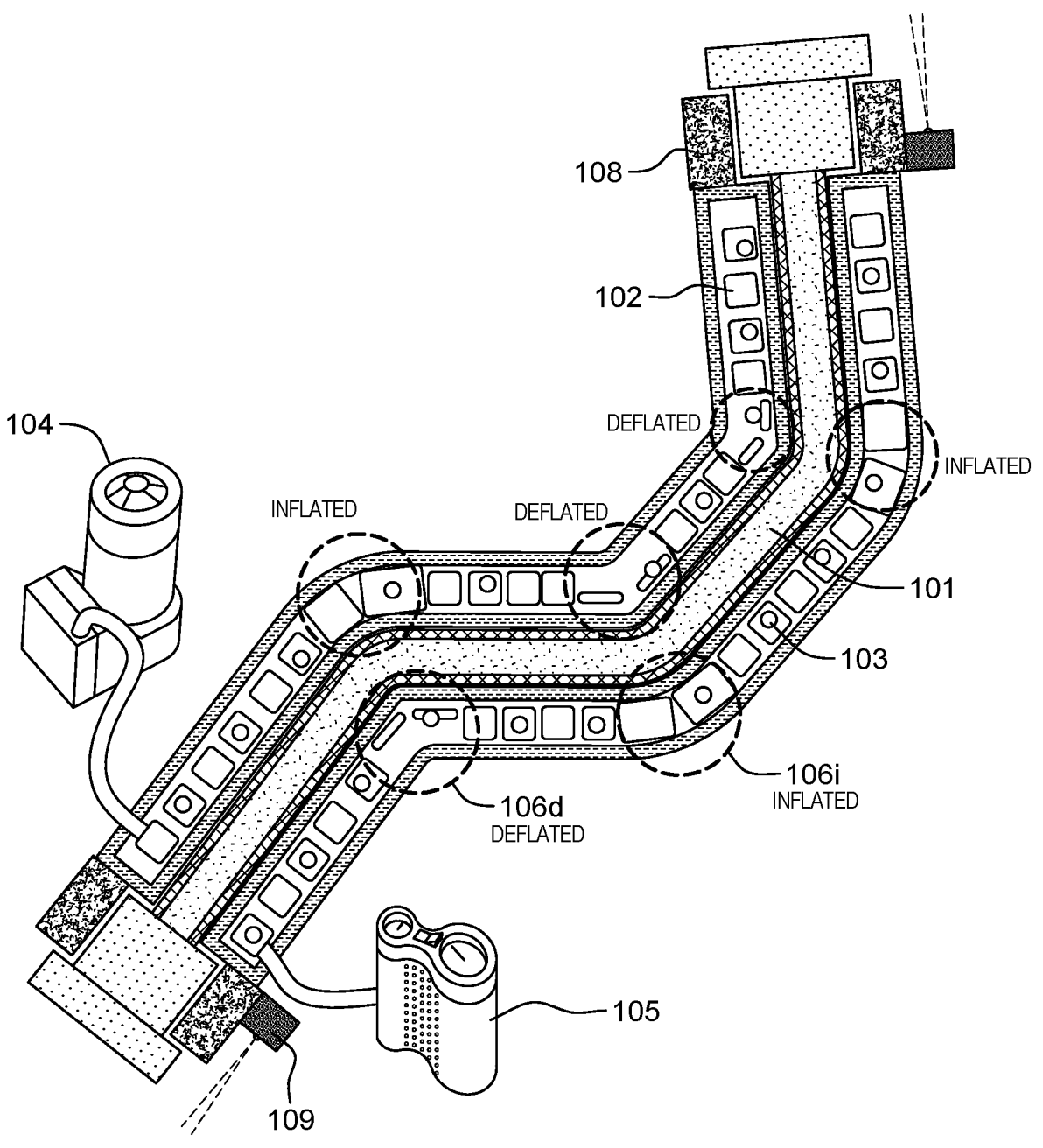

FIG. 1A and FIG. 1B illustrate a side cross-sectional view and a top cross-sectional view of a pressurized sleeve 100 for linear component 101 installation/uninstallation, respectively, in accordance with exemplary embodiments of the present invention.

The pressurized sleeve 100 (also referred to herein as the robotic cable sleeve 100) can be disposed to at least partially surround at least one linear component 101. The linear component 101 can be loaded/fed into the pressurized sleeve 100. The linear component 101 can be a wire, cable (e.g., electronic, fiber-optic, mechanical, etc.), rod, beam, rope, etc. The linear component 101 can be at least partially flexible. The pressurized sleeve 100 can include an elastic lining 107. The elastic lining 107 can be at least partially flexible. The pressurized sleeve 100 can include at least one connection orientation fixture 108. The pressurized sleeve 100 can include a plurality of pouches 102. The plurality of pouches 102 can be disposed in and/or on the pressurized sleeve 100. The plurality of pouches can be spaced in predetermined intervals and/or predetermined arrangements/configurations (groups/pairs/clusters/shapes) in at least one dimension/plane (e.g., a circular grouping configuration extending along a cross-sectional circumference of the pressurized sleeve 100 and/or rows extending in a lengthwise direction of the pressurized sleeve 100). The plurality of pouches 102 can have volumes with hydrostatic pressures that are discrete from one another and/or are at least partially integrated (e.g., based on the predetermined arrangements/configurations). The pressurized sleeve 100 can include a plurality of sensors 103 (e.g., bend sensors, strain gauges, hydrostatic pressure sensors, vibrational sensors, audio sensors, etc.). The pressurized sleeve 100 can include and/or be connected to a pump 104 (e.g., pneumatic and/or hydraulic) and/or a compressor 105 (e.g., pneumatic and/or hydraulic). The pump 104 and the compressor 105 can be used cooperatively and/or alternatively as either an inlet or outlet. The connection orientation fixture 108 can be disposed on at least one terminal end of the pressurized sleeve 100. The connection orientation fixture 108 can include a connection orientation fixture laser 109. The connection orientation fixture laser 109 can facilitate linear component 101 installation/uninstallation (e.g., by detecting spatial movement/position/angle/orientation/connection site adjacency accuracy, etc.). The pressurized sleeve 100 and/or sub-components thereof (e.g., the sensors 103, the air pouches 102, the connection orientation fixture 108, the connection orientation fixture laser 109, the pump 104, and/or the compressor 105, etc.) can be connected to a controller 304 (shown in FIG. 3) and/or an external computing device 405 (shown in FIG. 4).

In the case of a pneumatic pump 104 and/or a pneumatic compressor 105, various predetermined gases (e.g., air) can be used. In the case of a hydraulic pump 104 and/or a hydraulic compressor 105, various predetermined fluids (e.g., water) can be used. The pouches 102 can be adjusted (e.g., inflated and/or deflated) according to predetermined hydrostatic pressures (e.g., calculated by the controller 304). The hydrostatic pressures can be adjusted by the pump 104 and/or the compressor 105 (e.g., calculated/implemented by the controller 304 via electrical signal based on calculated predetermined hydrostatic pressures). The hydrostatic pressures of the pouches 102 can be adjusted uniformly, individually, and/or in arrangement/configurations (e.g., at least a partial circular configuration, opposing pairs, segments, etc.) to achieve a predetermined motion in at least one dimension (e.g., axial movement, elongation, contraction, curve, bend, twist, angle, orientation, position, shape, etc.) of the pressurized sleeve 100 and/or the corresponding portion of the at least partially surrounded linear component 101 in at least one dimension/plane. At least some of the pouches 102 can have predetermined hydrostatic pressures that are nonidentical to one another, transient, and/or static (e.g., permanent or premanufactured). Predetermined hydrostatic pressures can include opposing inflated/tension and deflated/compression regions 106i/106d, respectively, which can be disposed substantially in parallel to one another.

The predetermined hydrostatic pressures can be a predetermined hydrostatic pressure of resistance that exceeds a predetermined (e.g., calculated by the controller 304 and/or determined based on the extracted features from the obtained data) capacity of physical manipulation/force (e.g., bending) by human operators and/or installation/uninstallation apparatuses (e.g., the pressurized sleeve 100). Excessive physical manipulation can refer to a force and/or induced motion with predetermined potential to cause damage to the linear component 101 (e.g., at/exceeds a minimum bend radius of the linear component 101) and/or the pressurized sleeve 100. At least some of the pouches of the plurality of pouches 102 can be calibrated to pop (e.g., audibly and/or by sensor 103 detection) when excessive physical manipulation occurs. The regions of tension/inflated and/or the compression/deflated 106i/106d can, for example, create resistance to excessive bending of the corresponding portion of the at least partially surrounded linear component 101 and/or the pressurized sleeve 100. The different predetermined hydrostatic pressures can cooperatively induce the predetermined motion of at least a portion of the pressurized sleeve 100 and the corresponding portion of the at least partially surrounded linear component 101.

Figure 2:
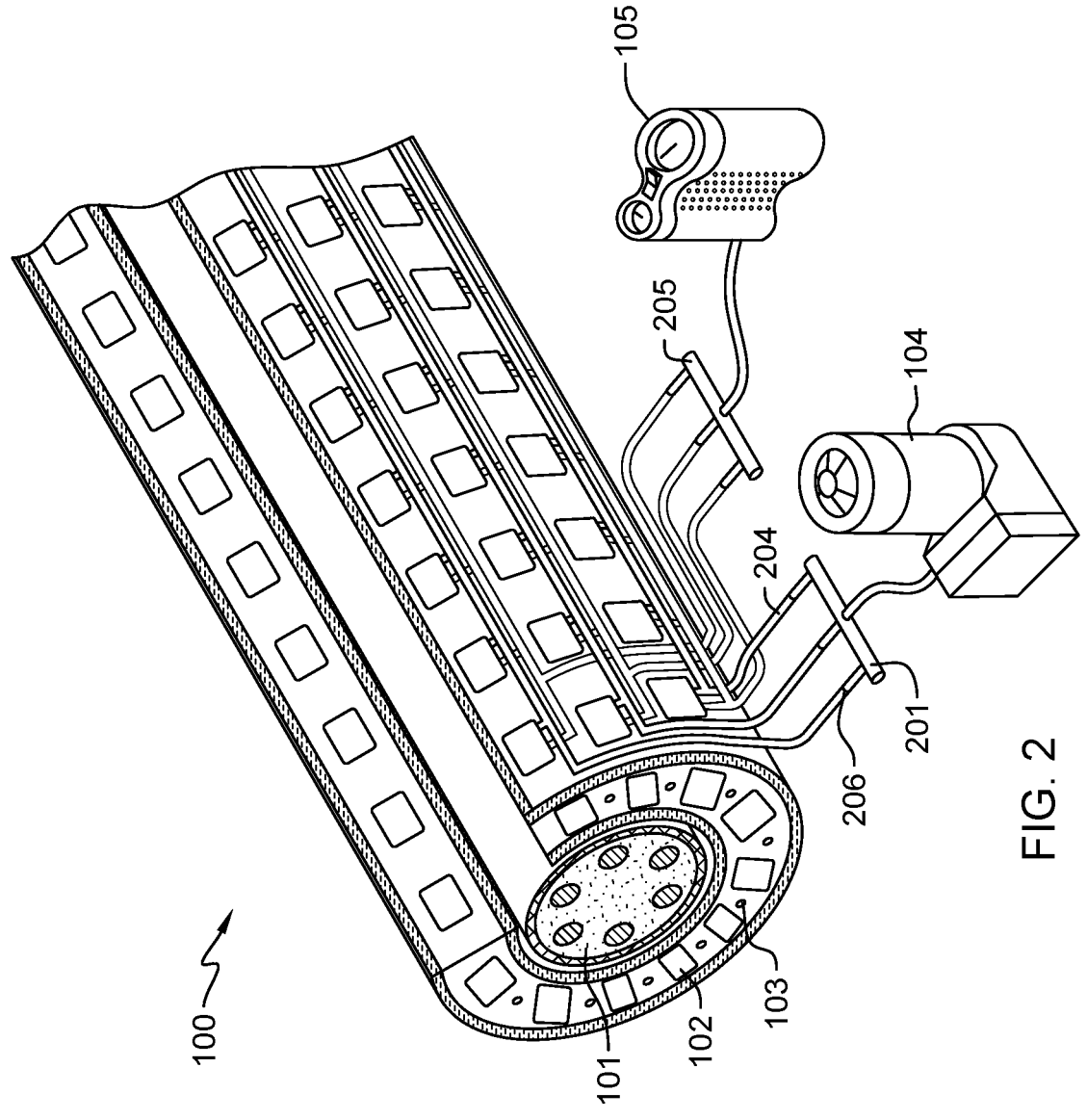
FIG. 2 illustrates a perspective x-ray view of a pressurized sleeve 100 for linear component 101 installation/uninstallation, in accordance with an exemplary embodiment of the present inventive concept.

FIG. 2 illustrates a perspective x-ray view of a pressurized sleeve 100 for linear component 101 installation/uninstallation, in accordance with an exemplary embodiment of the present invention. The pressurized sleeve 100 can include at least one gas (e.g., air) and/or fluid (e.g., water) manifold 201. The manifold 201 can be adjustably connected to the controller 304. The manifold 201 can be connected to the compressor 105 and/or the pump 104. The compressor 105 and/or the pump 104 can be further connected to a plurality of compressor lines 205 and/or a plurality of pump lines 204, respectively. The compressor lines 205 and/or the pump lines 204 can be connected to at least some of the pouches 102 (e.g., discrete, at least partially integrated, and/or according to arrangement/configuration. The compression lines 205 and/or the pump lines 204 can resemble arterial connectivity to organic tissues. The at least one manifold 201 can include a plurality of manifold openings 206 and/or manifold apertures thereof. The apertures of the manifold openings 206 can be adjustably connected to the controller 304 (e.g., opened/closed, dilated/constricted, etc.), to achieve precise predetermined hydrostatic pressures of the predetermined pouches 102.

Figure 3:
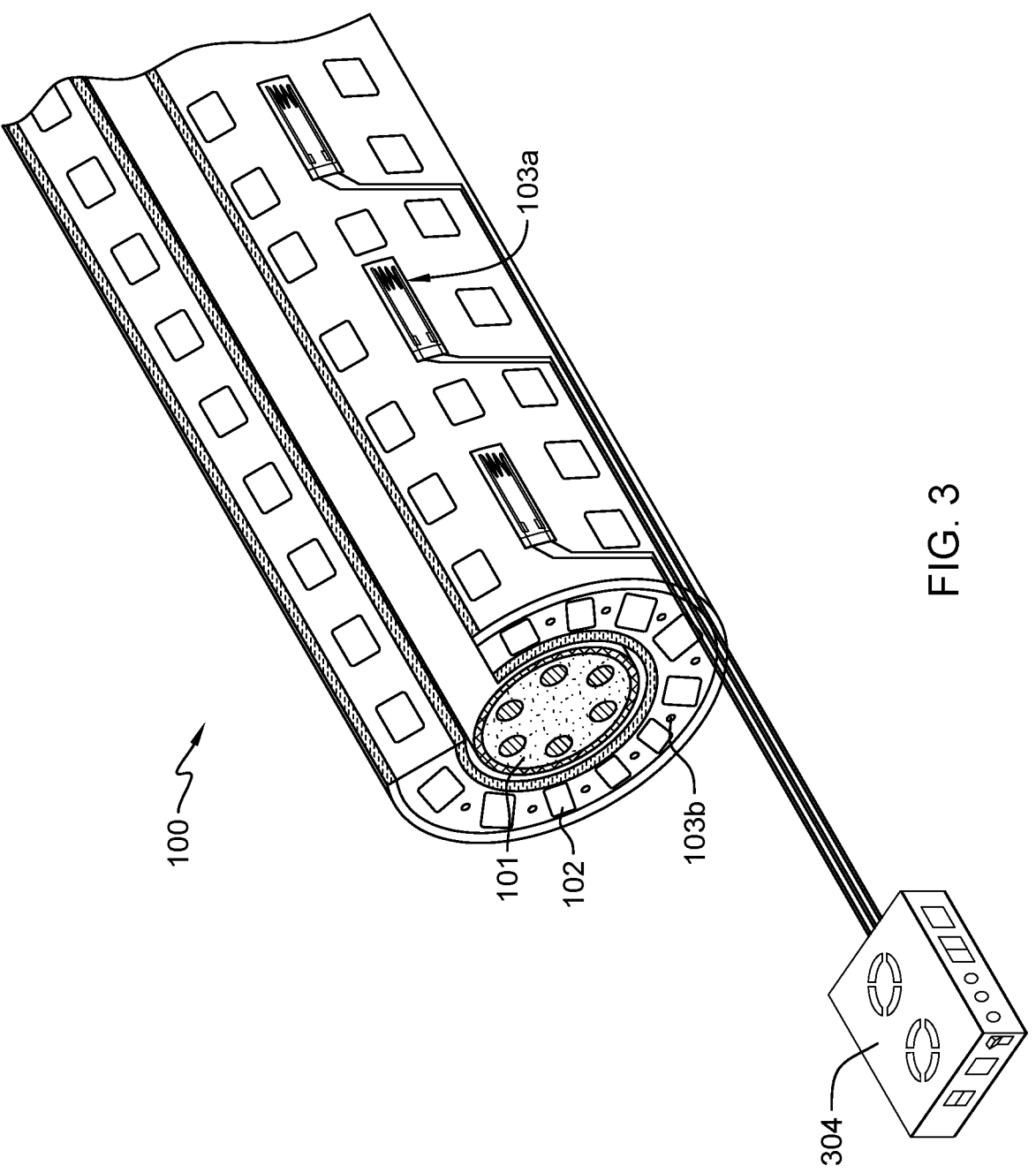
FIG. 3 illustrates a perspective x-ray view of a pressurized sleeve 100 for linear component 101 installation/uninstallation, in accordance with an exemplary embodiment of the present invention.

FIG. 3 illustrates a perspective x-ray view of a pressurized sleeve 100 for linear component 101 installation/uninstallation, in accordance with an exemplary embodiment of the present invention. The pressurized sleeve 100 can include the sensors 103 (e.g., strain gauges and bend sensors). The sensors 103 can be arranged/configured as described/illustrated with respect to FIG. 1 and/or differently from one another as appropriate for predetermined measurement value obtainment. For example, the strain gauges 103a can be arranged differently from the bend sensors 103b (e.g., in a lengthwise configuration versus a circular/circumferential configuration). As aforementioned, the sensors 103 can be further connected to the controller 304.

Figure 4:
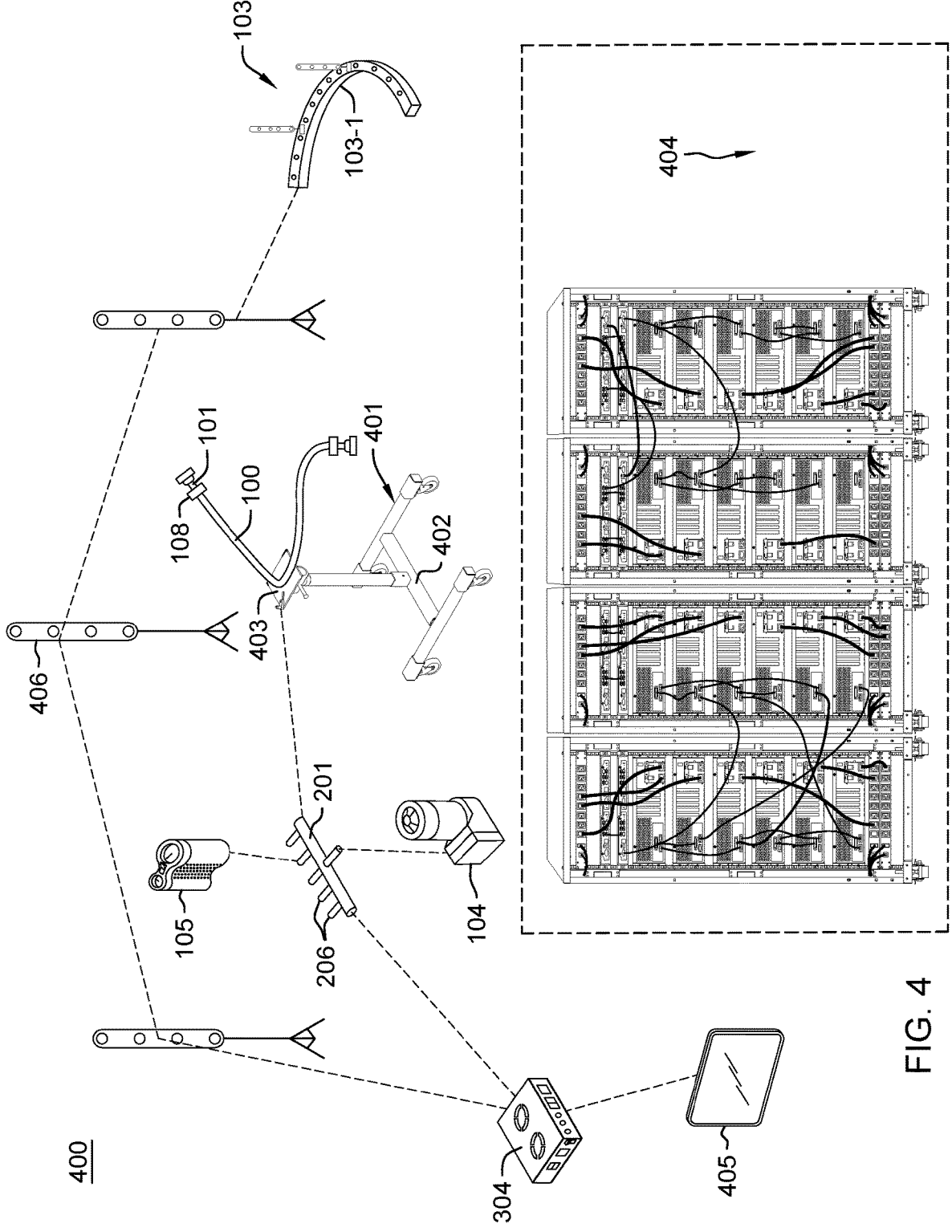
FIG. 4 illustrates a schematic view of a system implementation that includes a pressurized sleeve 100 for linear component 101 installation/uninstallation, in accordance with an exemplary embodiment of the present invention.

FIG. 4 illustrates a schematic view of a system implementation that includes the pressurized sleeve 100 for linear component 101 installation/uninstallation, in accordance with an exemplary embodiment of the present invention.

The system implementation of the pressurized sleeve 100 can be planned and/or occur in a predetermined project environment 400 such as a predetermined project space (e.g., a room). The project environment 400 can include a predetermined cabling workspace 404 of predetermined dimensions/characteristics, at least one 3D depth camera 406, an external computing device 405 (can also be remotely located), and/or at least one IoT feed. The cabling workspace 404 can include the apparatus for installation/uninstallation of the linear component 101. The robotic stand 401 and/or sub-components thereof (e.g., a base 402 and/or a fixture 403) can be connected to the controller 304 and/or the external computing device 405. The controller 304 and/or the external computing device 405 can be further connected to one another, the pressurized sleeve 100 and/or sub-components thereof (e.g., the at least one 3D depth camera 406 and/or the IoT feed (e.g., to get a 3D model of the project environment 400, project environment dimensions, evaluate progress, to facilitate linear component 101 installation/uninstallation, detect deviations, etc. in real-time)), the at least one manifold 201, the manifold openings 206, and/or the manifold apertures thereof, etc.

The controller 304 and/or the external computing device 405 can perform feature extraction on the obtained project data, analyze extracted features, and/or calculate logistics of project design implementation (e.g., installation/uninstallation), such as negotiating various installation factors (e.g., connector styles, linear component characteristics (e.g., flexibility, dimensions, types, materials, manufacturers, minimum/maximum bend radii, etc.), configuration characteristics (e.g., project designs and inevitable deviations therefrom, space limitations, destination points, etc.), plug forces, etc. The controller 304 can perform predetermined adjustments to the robotic stand 401 (e.g., to achieve a predetermined height, orientation, angle, and/or position, etc.), as calculated to be necessary for the predetermined project design implementation (e.g., installation/uninstallation of the linear component 101), step(s), and/or dynamic modifications thereto. After the linear component 101 is loaded into the pressurized sleeve 100, the controller 304 and/or the external computing device 405 can adjust predetermined hydrostatic pressures of the predetermined pouches 102 to achieve desired actions (e.g., movements (e.g., axial moving, routing, angling, bending, curving, orienting, positioning, etc.), spatial positions (e.g., of the linear component 101 and/or terminal ends (e.g., plugs) thereof (e.g., relative to connection sites)), 3D shapes, installation/uninstallation, etc.).

The robotic stand 401 can be adjustably moved (e.g., rotated/raised/lowered/moved/angled/oriented, etc.) mechanically, by the controller 304, and/or the external computing device 405 (e.g., via electrical signal). For example, the base 402 can be equipped with a means for movement (e.g., pivots, bearings, wheels, treads, propellors, etc.). Adjustments to the robotic stand 401 can be calculated/implemented according to a predetermined project design and/or dynamic changes thereto. The fixture of the robotic stand 401 can include an adjustable sphincter (e.g., connected to the pump 104 and/or the compressor 105 for diametric expansion/contraction), clasp, ring, tie, etc. to secure/remove the linear component 101 and/or the pressurized sleeve 100. The pressurized sleeve 100 can be loaded into the fixture 403. The linear component 101 can be loaded into the pressurized sleeve 100. The base 402 and/or the fixture 403 can be adjusted (e.g., tilted, asymmetrically elongated/contracted, etc.) to achieve a relative loaded position of the linear component 101 in relation to a predetermined point of the pressurized sleeve 100 and/or the robotic stand 401 (e.g., to ensure symmetrical loading relative to the fixture 403).

In an embodiment, to get a greater quality 3D model of the project environment 400, one or more of the sensors 103 can move along a track 103-1 (e.g., a linear guide track) to capture various perspectives (e.g., movements, angles, positions, spatial positions, orientations, 3D shapes, etc.).

The presence/absence of the robotic stand 401 and/or project elements in the predetermined project environment 400 can be determined by the controller 304 and/or the external computing device 405 from analyzed extracted features from real-time obtained project data (e.g., via the at least one 3D depth camera 406 and/or IoT feed). In an embodiment, when a project environment 400 does not include the robotic stand 401 and/or predetermined project elements upon initiation of a predetermined project, the controller 304 and/or the external computing device 405 can deploy the robotic stand 401 (e.g., with the pressurized sleeve 100 and/or the linear component 101), orchestrate delivery of the predetermined project elements, modify the predetermined project environment 400, and/or alert a predetermined user accordingly.

Figure 5:
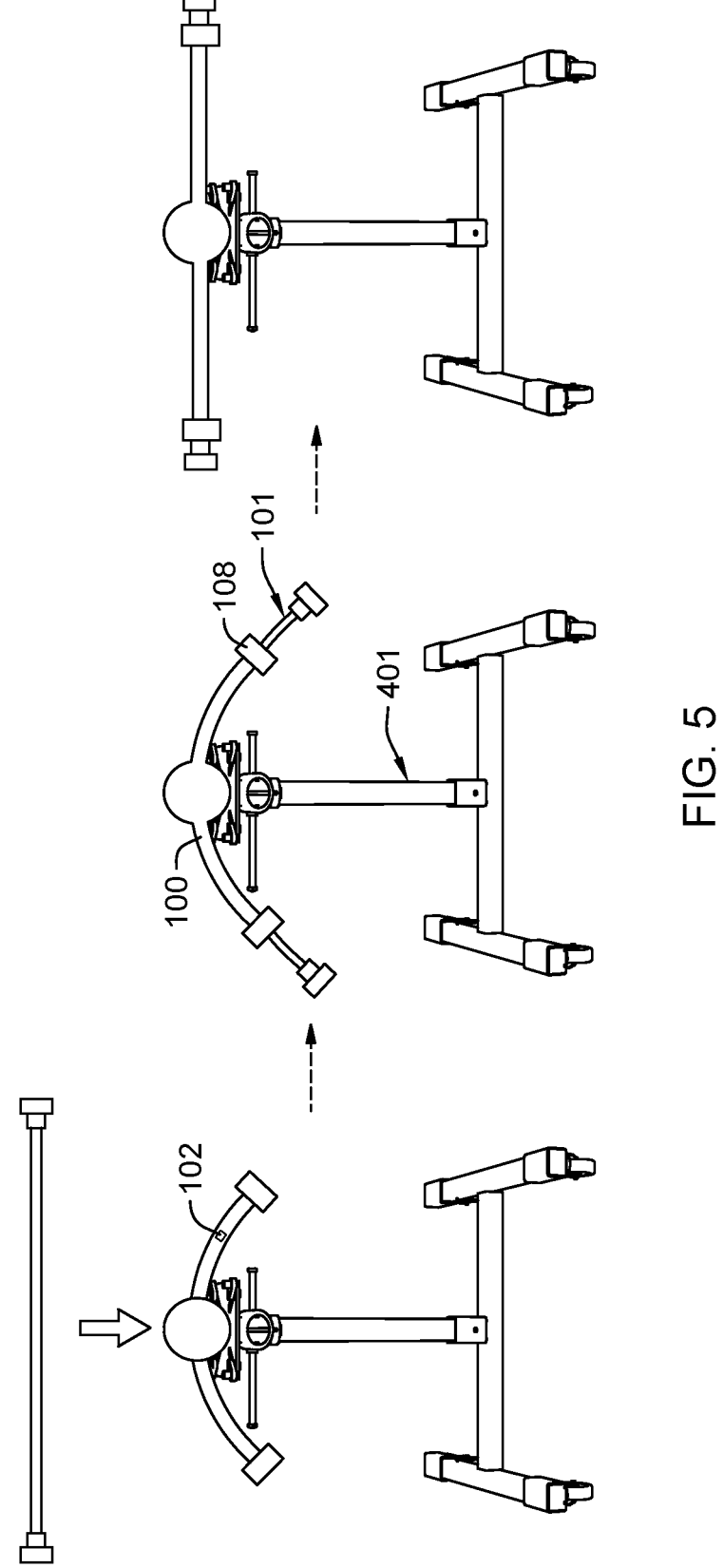
FIG. 5 illustrates a schematic view of a system implementation for a pressurized sleeve 100 for linear component 101 installation/uninstallation, in accordance with an exemplary embodiment of the present invention.

FIG. 5 illustrates a schematic view of a system implementation that includes a pressurized sleeve 100 for linear component 101 installation/uninstallation, in accordance with an exemplary embodiment of the present invention.

The linear component 101 can be loaded into the pressurized sleeve 100 (e.g., the robotic cable sleeve 100) connected to the robotic stand 401 (e.g., by the fixture 403). The initial inflation of at least some of the pouches 102 can be calculated to effectuate an axial movement of the pressurized sleeve 100 and/or at least partially surrounded linear component 101 such that they are substantially parallel to a plane of the ground for installation or vice versa in the case of uninstallation. The pressurized sleeve 100 can initially only partially surround the linear component 101 and can extend to terminal ends thereof upon the controller 304 and/or the external computing device 405 adjusting a predetermined inflation and/or deflation (e.g., predetermined hydrostatic pressures) of at least some predetermined pouches 102 via adjustments to the pump 104 and/or the compressor 105. Upon net inflation of the at least some of the pouches 102, the pressurized sleeve 100 can extend to at least one terminal end of the linear component 101 and can completely surround the body of the linear component 101 (or vice versa in the case of net deflation). In an embodiment, a predetermined buffer slack space can be calculated/provided at terminal ends of the linear component 101 such that further inflation of the pressurized sleeve 100 will provide a requisite predetermined connection force (e.g., the plug force) to complete installation. For example, further inflation of at least some pouches 102 in the terminal ends of the pressurized sleeve 100 can facilitate installation of the linear component 101 when the controller 304 and/or the external computing device 405 confirms a predetermined shape/spatial position/movement thereof based on the connection orientation fixture laser 109 of the connection orientation fixture 108, the IoT feed, and/or the at least one 3D depth camera 406. In an embodiment, the pressurized sleeve 100 can extend by a predetermined length beyond at least one terminal end of the linear component 101 to provide a predetermined hydrostatic pressure cushion for shock absorption (e.g., plugging, suspension, etc.).

Figure 6:
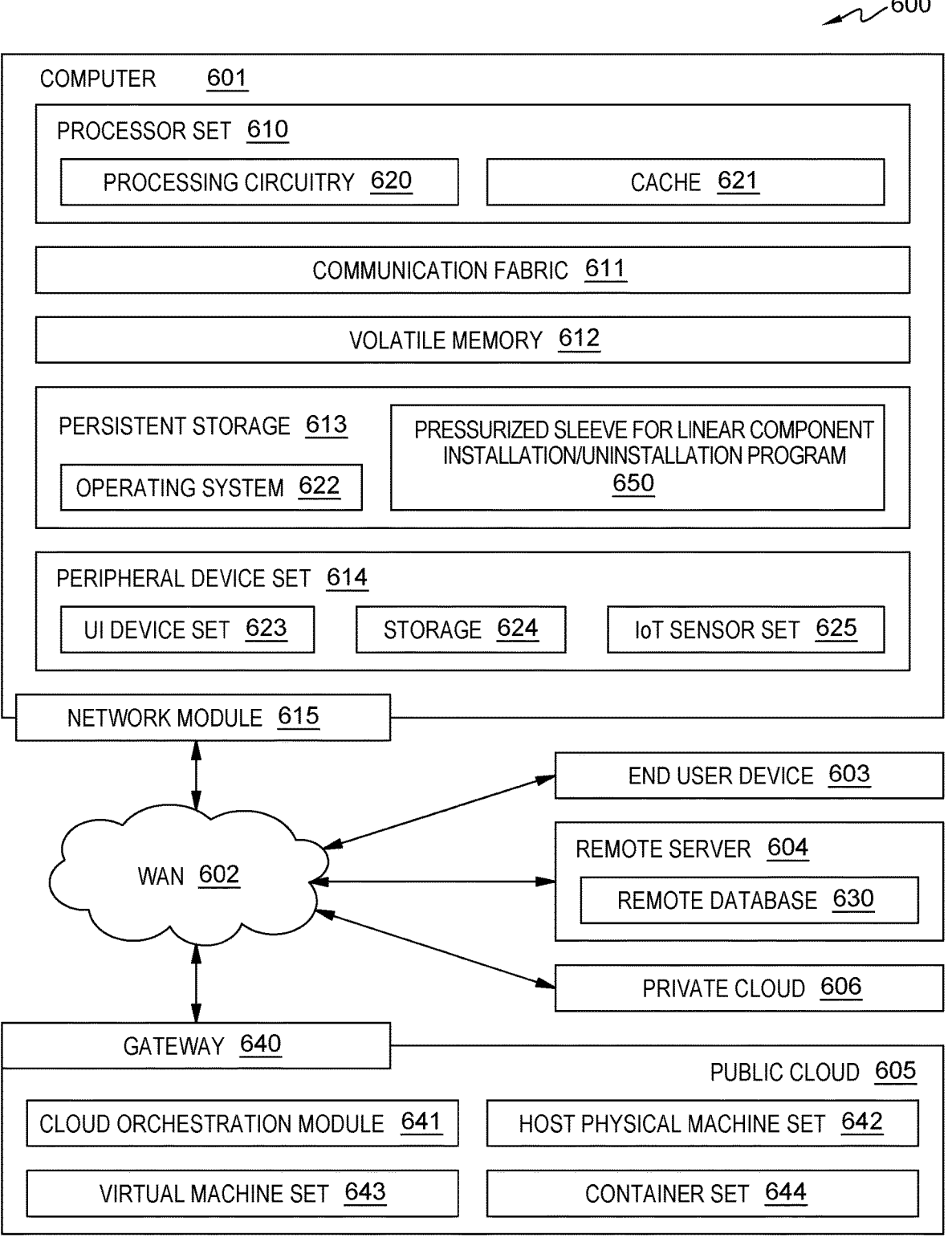
FIG. 6 illustrates a schematic diagram of a computing environment 600 including a pressurized sleeve for linear component installation/uninstallation program 650, in accordance with an exemplary embodiment of the present inventive concept.

FIG. 6 illustrates a schematic diagram of computing environment 600 including a pressurized sleeve for linear component installation/uninstallation program 650, in accordance with an exemplary embodiment of the present inventive concept.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 contains an example of an environment for the execution of at least some of the computer code involved in performing the inventive methods, such as the pressurized sleeve for linear component installation/uninstallation program 650. In addition to block 650, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 650, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 650 in persistent storage 613.

COMMUNICATION FABRIC 611 is the signal conduction path that allows the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel. The code included in block 650 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

FIG. 7 illustrates a block diagram of components 751-753 included in the pressurized sleeve for linear component installation/uninstallation program 650, in accordance with an exemplary embodiment of the present inventive concept.

The pressurized sleeve for linear component installation/uninstallation program 650 can include an obtainment component 751. The obtainment component 751 can obtain project data related to a project that includes installation and/or uninstallation of at least one linear component 101 (e.g., at least partially flexible) based on at least one of user input and/or predetermined extracted features signifying the project from the obtained project data. The obtainment component 751 can obtain real-time, published, and/or prior project data (e.g., linear component data and/or project environment data, etc.) from various sources, including but not limited to: user input, prior machine learning (e.g., similar/identical projects, project environments 400, and/or predetermined project elements, etc.), the IoT feed, the at least one 3D depth camera 406, the 3D models, the controller 304, the pressurized sleeve 100, the sensors 103 (e.g., the bend sensors 103b, the strain gauges 103a, the hydrostatic pressure sensors, the connection orientation fixture 108, connection orientation fixture lasers 109, etc.), operation logs, connected computing devices (e.g., the external computing device 405, a manufacturing extraction system, the controller 304, other robotic devices involved in the implementation of the project, relevant repositories, databases, inventories, etc.), via the network (e.g., web search for published project materials/manuals/instructions/project designs/recalls/disclaimers/reviews, etc.), and/or project design implementation simulations. The obtainment component 751 can obtain project element (e.g., apparatus for installation and/or uninstallation, linear component 101, other components, robotic cabling devices (e.g., the pressurized sleeve 100), sub-components, human operators, etc.) characteristics and/or project environment 400 characteristics by extracting features from the respective obtained project data with relevant machine learning processes. The extracted project element characteristics can include, but is not limited to project element: installation/uninstallation means types (e.g., robotic cabling device (e.g. the pressurized sleeve 100), the robotic stand 401, sub-components thereof, and/or human operators, etc.); installation/uninstallation means capacities/limitations (e.g., mobility, accuracy, efficiency, delicacy, precision, forces, reach, etc.); types of linear components 101, sub-components, and/or other components/project elements (e.g., wires, connectors, cables, ropes, rods, beams, clasps, ties, type of apparatus for installation and/or uninstallation (e.g., mainframe, pulley, gondola, support structure, etc.), robotic cabling tools and/or mobility mechanisms thereof, etc.); properties (e.g., mechanical, chemical, electrical, etc.); project element structures (e.g., flexibility, sub-components, layers, dimensions (e.g., 3D shapes, lengths, widths, circumferences, diameters, bends, curves, angles, shapes, etc.), relationships/connectivity/function, etc.); compositions (e.g., materials, compounds, elements, etc.); project element conditions (e.g., age, use duration, magnitudes of prior use (if any), damage, maintenance, replacement, efficiency, etc.); use thresholds/requisites/ranges/maximums/minimums (e.g., electrical (e.g., voltage, resistance, capacitance, etc.), mechanical (e.g., hydrostatic pressures, tensions, bends (e.g., minimum bend radius), compressions, torsion, and/or shearing), thermal (e.g., internal/external/adjacent/regional/positional temperatures), connection forces (e.g., plug forces), lifespan (e.g., durability, arrangement predisposition of project elements (e.g., outer sub-components, high wear-and-tear project elements, etc.), predetermined ages/use durations/use magnitudes, predetermined effects of deviations, etc.); and/or project element installation/uninstallation connection mechanisms (e.g., routing, plugging/unplugging, affixing/removing, soldering/melting, tethering/untethering, etc.), etc.

The extracted project environment characteristics can include a project: type, minimum/maximum/predetermined space and/or dimensions thereof; ambient/internal/external temperatures, design (e.g., included project elements, orders, 3D models, project element arrangement/groups, project element occupied/unoccupied space, predetermined buffer spaces, routes, bends, angles, curvatures, axial movements, 3D spatial movements/positions, connection points (e.g., plug sites, destinations, etc.), segmented route dimensions/orientations/3D movements/positions, predetermined means/mechanisms of installation/uninstallation, instructions, predetermined human operator vs. automated steps, predetermined parameters, predetermined installation and/or uninstallation sequences, predetermined potential project element substitutes, predetermined project element priorities, etc.); status (e.g., allocated/mobilized/installed/uninstalled/substituted/replaced project elements, stages/steps of completion and/or relative predetermined durations/times, complications, modifications, thermal/electrical/mechanical/operation values/risks, etc.); and/or project element inventories.

For example, the obtainment component 751 can identify a new project (i.e., mainframe assembly including cable routing) received from feature extraction and analysis of project data received from a connected external computing device 405. The obtainment component 751 can extract features such as project elements, a preliminary project design, project element orders, project type, parameters/instructions, flexible linear components 101 (i.e., cable), other components (i.e., other cables, fixtures, fasteners, etc.), cable minimum bend radius, cable dimensions, an apparatus for installation/uninstallation (i.e., a mainframe), etc.) and a predetermined project environment 400. The obtainment component 751 can further obtain live project data from the project environment 400 via in situ IoT feed and 3D depth cameras 406, extract features of the apparatus (e.g., the mainframe) and dimensions thereof, the pressurized sleeve 100 (i.e., the robotic cable sleeve 100), the affirmative presence of the robotic stand 401, the cabling workspace 404, and/or dimensions thereof.

The pressurized routing linear components program 650 can include an analysis component 752. The analysis component 752 can obtain a project design (e.g., preliminary, modified, and/or optimal) via user input, the extracted features, and/or generation based on an analysis of the extracted project element characteristics and/or the extracted project environment characteristics. The analysis component 752 can interpolate the extracted element characteristics and/or the extracted project environment characteristics and perform calculations/simulations with precise values to identify project designs (e.g., routes, 3D spatial positions/movement/shapes, distances, connection points, angles, curvatures, orientations, segments, bends, etc.), implementations, and/or actual/predicted project risks (e.g., deviations in predetermined use parameters, damage, spatial conflicts, and/or functionality of project elements, resource sufficiency, interference between robotic cabling devices and/or human operators, project apparatus efficiency/lifespan, etc.), etc. The generated project design can be at least partially based on mitigating the calculated risks; predetermined project parameters (e.g., predetermined time, project element priorities, cost, etc.); feasibility; installation and/or uninstallation/connection points; requisite connection forces, and/or optimal project element arrangements/configurations/pairs/groups/movement/positions/orientations/angles/connections from among a plurality of project element arrangements/configurations/pairs/groups/movement/positions/orientations/angles/connections (e.g., primary routes, secondary routes, tertiary routes, etc.) based on analysis on the analyzed extracted project element characteristics and/or the extracted project environment characteristics (e.g., occupied/unoccupied space and/or a calculated buffer margin of predicted inevitable deviation therefor, dimensions, bends, curvatures, potential for damage to functionality, efficiency, and/or lifespan, priority, inventory, installation/uninstallation positions, etc.), and/or installation/uninstallation simulations (e.g., predicted space conflicts, incurred damage, loss of functionality, etc.)). The analysis component 752 can calculate required pouch 102 arrangements/configurations (e.g., groups/pairs/arrangements/configurations/positions/regions, etc.), and requisite hydrostatic pressures in the pressurized sleeve 100 necessary to implement the project design, step thereof, transient/permanent 3D shapes, and/or cable routes. The analysis component 752 can generate an interactive virtual display for a user. The interactive display can include a generated 3D model, simulation, extracted features, spatiotemporal risks, analysis annotations, and/or a timelapse of the project design (e.g., installation of the linear component 101) progress.

For example, the analysis component 752 can run a simulation of installation of the cable based on the preliminary project design for the assembly of the mainframe based on the analyzed and extracted features from the obtainment component 751. The analysis component 752 can identify project risks/thresholds/values (e.g., deviations in predetermined use parameters, damage, spatial conflicts, and/or functionality of project elements, resource sufficiency, interference between robotic cabling devices (e.g., the pressurized sleeve 100, robotic stand 401, other cabling devices, etc.) and/or human operators, project apparatus outputs, etc.). The analysis component 752 can modify the preliminary project design in accordance with the predetermined project parameters (e.g., predetermined time, project element priorities, cost, etc.), such as by changing installation orders, avoiding collisions between human operators and/or cabling devices, and optimizing cable routing. The optimized cable routing can be at least partially based on analysis of prior installation footage of similar mainframe assembly projects, which consistently resulted in position/route/movement/risk deviations. The analysis component 752 can calculate optimized cable routing from a plurality of potential cable routings based on calculated buffer space, the plug site locations, the cable dimensions, the deviations, project element crowding, and induced cable shapes that avoid incurring bends with a minimum bend radius and a predicted thermal dissipation from other project elements that exceed a threshold value.

The pressurized routing linear components program 650 can include an implementation component 753. The implementation component 753 can implement the project design and/or make dynamic modifications/improvisations thereto based on real-time calculations/predictions/precise values, such as by changing the routes, positions, curvatures, angles, movements, bends, and/or 3D shapes of linear components 101 via calculated hydrostatic pressurization of the pouches 102 of the pressurized sleeve 100. The implementation component 753 can be connected to the project elements, robotic cabling tools, and/or sub-components (e.g., the pressurized sleeve 100, the controller 304, the sensors 103, the manifolds 201, the manifold openings 206, manifold apertures, pouches 102, pumps 104, compressors 105, the robotic stand 401, etc.), the IoT feed, the 3D depth cameras 406, other project elements (e.g., the project apparatus/cabling workspace 404, the linear component 101, other project elements, sub-components, etc.); and/or an external computing device 405 (e.g., a manufacturing execution system, databases, inventories, repositories, etc.), etc. to implement the optimal project design. The implementation component 753 can make dynamic modifications to the implemented optimal project design based on real-time detection/prediction of inevitable deviations (e.g., spatial position/movement/orientation/angle/shape/route, etc.) in the installed/uninstalled project elements and/or calculated risks. The implementation component 753 can analyze/extract features from obtained project data in real-time, such as from IoT feed, the robotic cabling devices/pressurized sleeve 100 and subcomponents thereof (e.g., the sensors 103, the pouches 102, the popped pouches 102, etc.) and/or the at least one 3D depth camera 406 to calculate/predict use deviations, actual/latent risks, and/or actual/latent damage to project elements (e.g., the linear component, other components, the project apparatus, etc.), efficiency, and/or lifespan that would otherwise be imperceivable to a human operator alone. The implementation component 753 can perform adjustments to the optimal project design and/or the preexisting project design based on the calculated/predicted threshold deviations, actual/latent the risks, and/or the actual/latent damage to the project element (e.g., changing linear component 101 and/or other component routes/shapes/angles/orientations/segments, substituting project element types/units, changing applied installation/uninstallation positions, angles, orientations, applied forces and/or durations, changing mechanisms and/or components for installation/uninstallation, etc.). The implementation component 753 can provide real-time updates/suggestions to the interactive display for the user. In an embodiment that includes human operator connection, the implementation component 753 can calculate and implement predetermined hydrostatic pressures in the pouches 102 that can provide shock absorption at terminal ends and/or avoid excessive bending/physical manipulation.

For example, the implementation component 753 can implement the modified/optimized project plan generated by the analysis component 752. The implementation component can mobilize the robotic stand 401 to move into a calculated position/angle/orientation/height upon insertion of the cable 101 into the robotic cable sleeve 100. The implementation component can implement movements/steps to avoid mutual interference of mobilized human operators and/or cabling devices. The implementation component can initiate installation of the cable 101 by dilating manifold openings 206 and applying calculated hydrostatic pressures to air pouches 102 to induce axial movement of the robotic cable sleeve 100 and the at least partially surrounded cable 101 parallel to a plane of a floor of the project environment 400 via the pump 104. The 3D depth cameras 406 can confirm achievement of an initial position of the robotic cable sleeve 100 and the at least partially surrounded cable 101. The implementation component 753 can dilate calculated individual manifold openings 206 and apply calculated hydrostatic pressures via the pump 104 and/or the compressor 105 and respective lines 204/205 to achieve the calculated optimal cable routing and installation. The implementation component 753 can identify slightly above threshold strain values via strain gauges 103 of the robotic cable sleeve 100 and can offload requisite hydrostatic pressurization in the affected segment of the cable 101 to a calculated quantity/positions of adjacent air pouches 102 without compromising the general cable routing shape. The implementation component 753 can apply a calculated plug force once the connection orientation fixture laser 109 of the connection orientation fixture 108 confirms spatial positions of terminal ends that are adjacent to the respective plug sites. The implementation component can calculate downstream variations due to the adjustment, such as to a subsequent (lower priority) cable 101 and can adjust routes and configurations accordingly.

Figure 8:
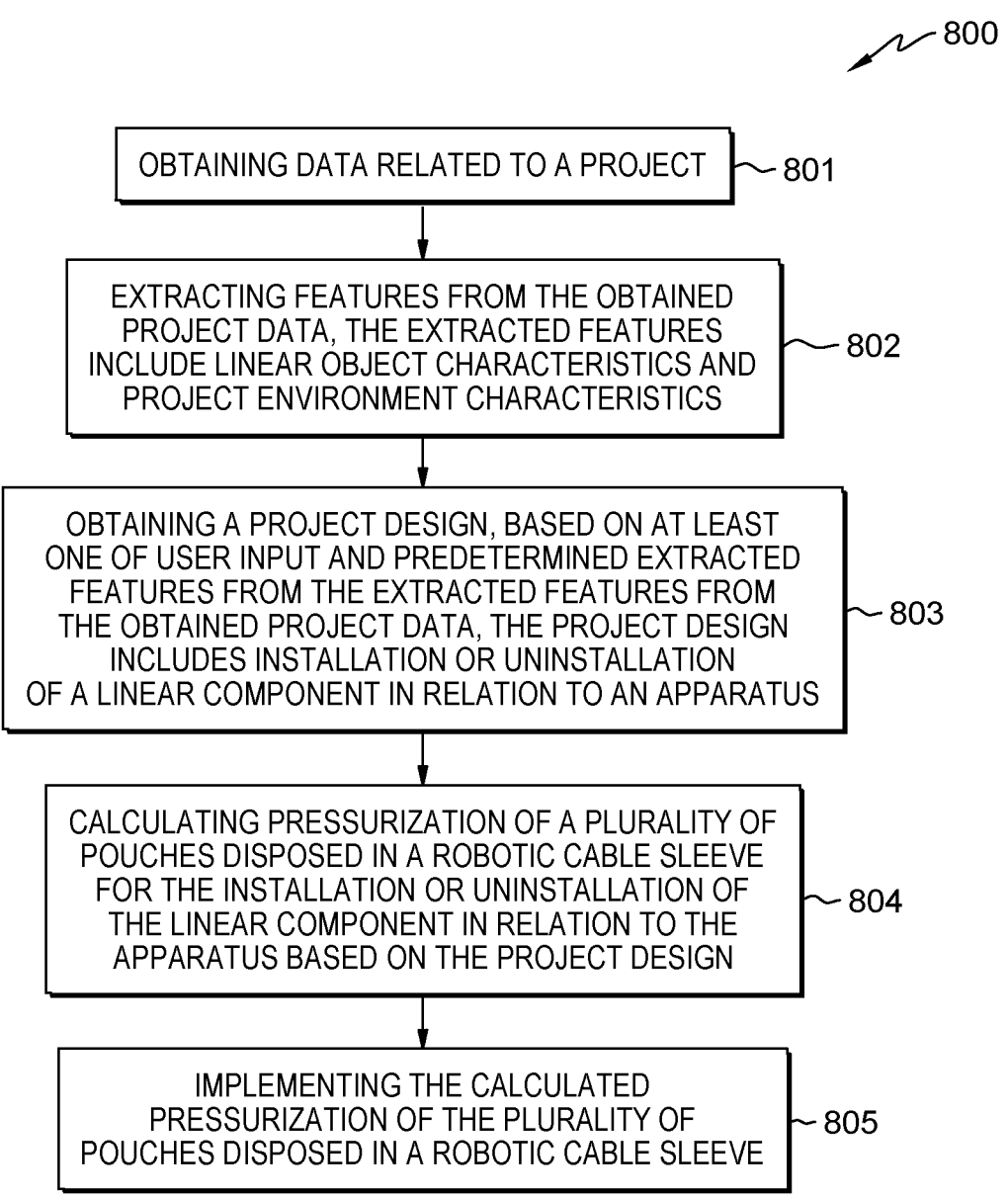
FIG. 8 illustrates a flowchart of a method of linear component installation/uninstallation using pressurized sleeve 800, in accordance with an exemplary embodiment of the present inventive concept.

FIG. 8 illustrates a flowchart of a method of linear component installation/uninstallation using pressurized sleeve 800, in accordance with an exemplary embodiment of the present inventive concept.

The method includes:

obtaining data related to a project (step 801);

extracting features from the obtained project data, the extracted features include linear component characteristics and project environment characteristics (step 802);

obtaining a project design, based on at least one of user input and predetermined extracted features from the extracted features from the obtained project data, the project design includes installation or uninstallation of a linear component in relation to an apparatus (step 803);

calculating pressurization of a plurality of pouches disposed in a pressurized sleeve for the installation or uninstallation of the linear component in relation to the apparatus based on the project design (step 804); and implementing the calculated pressurization of the plurality of pouches disposed in a pressurized sleeve (step 805).

Based on the foregoing, a pressurized sleeve for routing linear components, a system implementation, and a method therewith have been disclosed. However, numerous modifications, additions, and substitutions can be made without deviating from the scope of the exemplary embodiments of the present invention. Therefore, the exemplary embodiments of the present invention have been disclosed by way of example and not by limitation.

What is claimed is:

1. A pressurized sleeve for routing of linear components, comprising:

a linear component at least partially surrounded by the pressurized sleeve;

a connector orientation fixture disposed on at least one terminal end of the pressurized sleeve, wherein the connector orientation fixture includes a connection orientation laser for confirming planned spatial positioning; and a plurality of pouches disposed in the pressurized sleeve, wherein a first set of at least two pouches of the plurality of pouches have different predetermined hydrostatic pressures from one another which induce movement in at least one dimension of at least a portion of the pressurized sleeve and a corresponding portion of the at least partially surrounded linear component, and wherein a second set of at least two pouches of the plurality of pouches are calibrated to pop when bending equal to or greater than a predetermined minimum bend radius of the linear component occurs.

2. The pressurized sleeve of claim 1, wherein the linear component is at least partially flexible.

3. The pressurized sleeve of claim 1, wherein the linear component is a cable or a wire.

4. The pressurized sleeve of claim 1, wherein at least one of a pump and a compressor are used to adjust the different predetermined hydrostatic pressures.

5. The pressurized sleeve of claim 4, wherein the pressurized sleeve is connected to a robotic stand, wherein the robotic stand is connected to the pump, the compressor, at least one 3D depth camera, and a controller, and wherein the controller is further connected to a manufacturing execution system.

6. The pressurized sleeve of claim 5, wherein when the linear component is at least partially surrounded, at least partially flexible, and loaded into the pressurized sleeve, the controller uses the pump to inflate at least some of the plurality of pouches to induce axial movement such that the linear component is substantially parallel to a plane of a project environment floor.

7. The pressurized sleeve of claim 6, wherein the at least some of the pouches that are inflated cause the pressurized sleeve to extend in at least one dimension to at least one terminal end of the linear component.

8. The pressurized sleeve of claim 4, wherein an installation or an uninstallation of the linear component in relation to an apparatus is performed by the adjusting of the different predetermined hydrostatic pressures based at least in part on a minimum bend radius, linear component route, and connection points.

9. The pressurized sleeve of claim 1, wherein the different predetermined hydrostatic pressures are static or transient.

10. The pressurized sleeve of claim 1, wherein the induced movement includes at least one bend in the at least the portion of the pressurized sleeve and the corresponding portion of the at least partially surrounded linear component.

11. The pressurized sleeve of claim 10, wherein the at least one bend includes a region of tension and a region of compression.

12. The pressurized sleeve of claim 11, wherein the region of tension and the region of compression are disposed substantially parallel.

13. The pressurized sleeve of claim 12, wherein the region of compression and the region of tension create a resistance to excessive bending of the corresponding portion of the at least partially surrounded linear component.

14. The pressurized sleeve of claim 1, wherein the different predetermined hydrostatic pressures are each pneumatic or hydraulic.

15. The pressurized sleeve of claim 1, wherein the induced movement includes axial moving, routing, bending, curving, orienting, and angling of at least a portion of the pressurized sleeve and the corresponding portion of the at least partially surrounded linear component.

16. A pressurized sleeve for routing of linear components, comprising:

a robotic cable sleeve disposed at least partially surrounding a flexible linear component; and a plurality of pouches and a plurality of sensors disposed in the robotic cable sleeve, wherein at least two of the plurality of pouches have different predetermined hydrostatic pressures from one another that induce or preserve a predetermined shape of at least a portion of the robotic cable sleeve and a corresponding portion of the at least partially surrounded flexible linear component, and wherein a second set of at least two pouches of the plurality of pouches are calibrated to pop when bending equal to or greater than a predetermined minimum bend radius of the linear component occurs.

17. A pressurized sleeve for routing of linear components, comprising:

a robotic cable sleeve disposed at least partially surrounding an at least partially flexible linear component, wherein the at least partially flexible linear component is a wire or a cable, and wherein the robotic cable sleeve includes a plurality of sensors and a plurality of pouches with adjustable hydrostatic pressures, wherein a first set of at least two pouches of the plurality of pouches have different predetermined hydrostatic pressures from one another which induce movement in at least one dimension of at least a portion of the pressurized sleeve and a corresponding portion of the at least partially surrounded linear component, and wherein a second set of at least two pouches of the plurality of pouches are calibrated to pop when bending equal to or greater than a predetermined minimum bend radius of the linear component occurs;

a robotic stand connected to the robotic cable sleeve;

a controller connected to the robotic cable sleeve and the robotic stand, wherein the controller adjusts hydrostatic pressures of at least some of the pouches with adjustable hydrostatic pressures of the plurality of pouches with the adjustable hydrostatic pressures; and at least one of a 3D depth camera and an Internet of Things (IoT) feed connected to the controller for obtaining real-time project element characteristics.

* * * * *